United States Patent

[11] 3,583,778

[72] Inventor Hideo Mori
317, Nishiawaji-machi, 3-chome
Higashisyodogawa-ku, Osaka-shi, Osaka-fu,
Japan

[21] Appl. No. 862,354
[22] Filed Sept. 30, 1969
[45] Patented June 8, 1971
[32] Priority Oct. 3, 1968
[33] Japan
[31] 43/85759

[54] COMBINATION THRUST-RADIAL BEARING
3 Claims, 19 Drawing Figs.

[52] U.S. Cl. .......... 308/172,
308/240

[51] Int. Cl. .......... F16c 19/12,
F16c 33/66

[50] Field of Search .......... 308/15, 22,
172, 121, 240, 135, 78, 26

[56] References Cited

UNITED STATES PATENTS 2,964,363 12/1960 Dajkin et al. .......... 308/240

*Primary Examiner*—Fred C. Mattern, Jr.
*Assistant Examiner*—Frank Susko
*Attorney*—Ostrolenk, Faber, Gerb & Soffen

ABSTRACT: An improvement of a plastic bearing wherein a separately prepared thrust bearing portion and radial bearing portion are combined into one body to enable them to carry thrust and radial frictions respectively.

INVENTOR.
HIDEO MORI

BY

Ostrolenk, Faber, Gerb & Soffen

ATTORNEYS

INVENTOR.
HIDEO MORI

BY

Ostrolenk, Faber, Gerb & Soffen

ATTORNEYS

INVENTOR.
HIDEO MORI

BY

Ostrolenk, Faber, Gerb & Soffen

ATTORNEYS

INVENTOR.
HIDEO MORI

BY
Ostrolenk, Faber, Gerb & Soffen

ATTORNEYS

INVENTOR.
HIDEO MORI

BY

ATTORNEYS

COMBINATION THRUST-RADIAL BEARING

This invention relates to a bearing made of plastic (synthetic resin) for use with a high-speed rotating body such as an electric motor, namely, a plastic bearing for use with a machine element in which both thrust and radial frictions are simultaneously encountered. More particularly, this invention relates to a combination thrust-radial bearing which combines into one body a thrust bearing portion to carry thrust of a rotating body and a radial bearing portion to carry friction in the radial direction, said thrust and radial bearing portions being individually prepared.

Generally speaking, when a plastic bearing made mainly of plastic (synthetic resin) such a polyamide resin (nylon), polyacetal resin, polycarbonate resin containing Teflon (trade name), etc., is used as a bearing for a rotating body, more particularly, when it is used at a temperature of 80 to 100 C. or for a rotating body such as an electric motor which itself produces heat, the defects of plastics are often significantly revealed and, consequently, its deformation or other impediments or troubles are caused in a comparatively short period of time. It is hardly necessary to take this deformation or troubles into consideration when such a bearing is operated at a normal temperature, but in such a case as described above, the temperature rise in the bearing due to friction heat will join in the acceleration of such deformation or troubles. Especially, a great care should be exercised when it is operated in a condition where thrust and radial frictions are simultaneously produced. In a plastic bearing to be used for such a rotating body as described above, especially, for a high-speed rotating body such as an electric motor, and more particularly, in a bearing for use with a machine element in which both radial and thrust frictions are simultaneously encountered, according to this invention, a portion to carry thrust of a rotating body and a portion to carry friction in the radial direction are individually prepared and then they are combined into one body to complete a combination thrust-radial bearing. In this way, thrust and radial frictions are separately carried by respective bearing portions. Furthermore, a radial bearing portion is made of synthetic resin with grease pockets provided therein in a monoblock and a thrust bearing portion made of metal is placed on said radial bearing portion to form a cap thereto or is fitted therein. Thus, thrust and radial frictions are separately carried and a certain extent of space is provided as a clearance between these two portions in order to prevent the deformation of a plastic radial bearing portion to be caused by the thermal expansion due to overheating.

The object and advantages of this invention will become apparent from the following description which should be read in conjunction with the annexed drawings. In the drawings.

Figure 16:
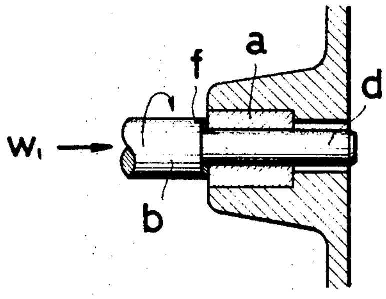
FIG.16 (PRIOR ART)
FIG. 16 is a sectional view of a plastic bearing of conventional type, to the side of which lateral pressure is directly applied.
Figure 17:
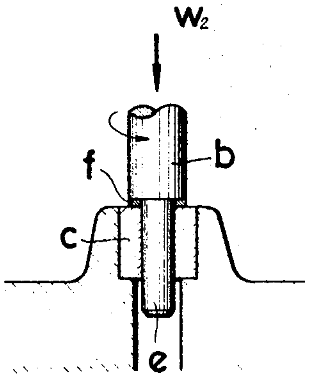
FIG.17 (PRIOR ART)
FIG. 17 is a sectional view of a plastic bearing of conventional type, to which vertical pressure is directly applied.

Below is given the explanation on the above-described thermal expansion of a plastic bearing, reference being made to the annexed drawings. If a lateral pressure $W_1$ is directly applied to the side of a plastic bearing *a* due to the rotation of a rotating body *b* as shown in FIG. 16, or a vertical pressure $W_2$ is directly applied to a plastic bearing *c* as shown in FIG. 17, this bearing *a* or *b* will have to carry both radial and thrust frictions simultaneously. Although a thin thrust washer *f* (made of plastic or metal) is normally provided between the rotating body *b* and the plastic bearing *a* or *c*, the effect of friction heat therefrom is small. In such a case, if rotating shafts *d* or *e* of the rotating body *b* are rotated at a high speed, the temperature rise due to friction heat will become high and it is inevitable that the thermal deformation of the bearing, which is a defeat of a plastic bearing, will be still more significantly developed as the ambient temperature becomes higher or in the case when a rotating body itself is a heating element.

Figure 18:
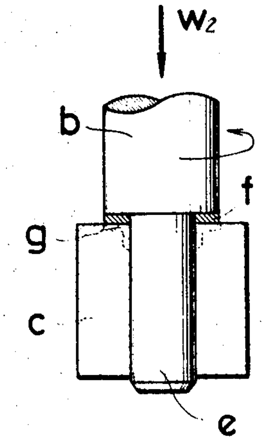
FIG.18 (PRIOR ART)
FIG. 18 is a sectional view of a part of a plastic bearing of conventional type where deformation tends to take place in the case when it is subjected to simultaneous radial and thrust frictions.
Figure 19:
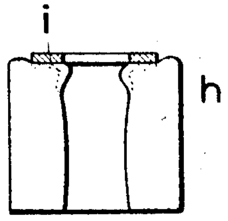
FIG.19 (PRIOR ART)
FIG. 19 is a sectional view depicting an example of a deformed condition of the plastic bearing shown in FIG. 18.

Below is given the explanation as to how and what part of a plastic bearing will be deformed in the above-described case. As shown in FIG. 18, the most significant deformation is developed at the top end surface of the plastic bearing, namely, at the contact portions *g* of said surface with the bottom end of the rotating body *b* and the top end periphery of the rotating shaft *e*. Creep takes place in the first stage of thermal deformation of the above-described portions and, then, the clearance of the bearing becomes zero. Finally, the temperature rise due to radial friction becomes excessive and the bearing is turned into a partly melted condition due to the thermal softening of synthetic resin, thus causing a deformation *i* in a plastic bearing *h* as shown in FIG. 19.

In order to prevent the deformation of such a plastic bearing as described above due to simultaneous application of radial and thrust frictions thereto, it will be a good practice, in my opinion, to separate the construction of a bearing into a portion to carry the friction in the radial direction and a portion to carry thrust friction to let them share their respective friction separately and combine them into one body. With this idea, a combination thrust-radial bearing has been proposed. In this way, direct application of a large thrust at a plastic bearing can be eliminated.

Figure 1:
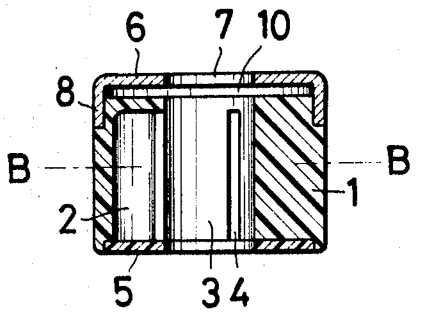
FIG. 1 is a cross-sectional front view of a bearing of this invention taken on the line A-A of FIG. 3.
Figure 2:
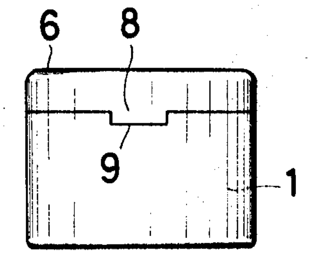
FIG. 2 is a side view of the bearing shown in FIG. 1.
Figure 3:
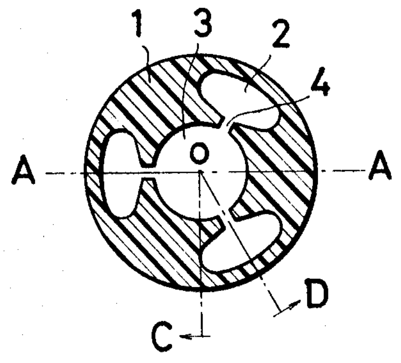
FIG. 3 is a cross-sectional plan view taken on the line B–B of FIG. 1.
Figure 4:
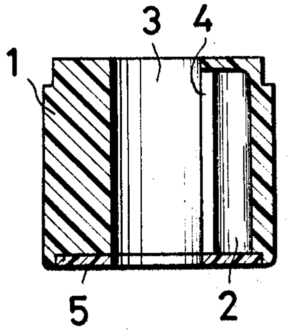
FIG. 4 is a vertical sectional side view taken on the line C–O–D of FIG. 3.
Figure 5:
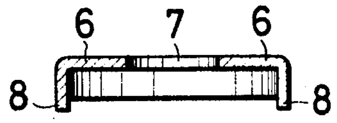
FIG. 5 is a sectional view illustrating only a thrust bearing portion of the bearing shown in FIG. 1.
Figure 6:
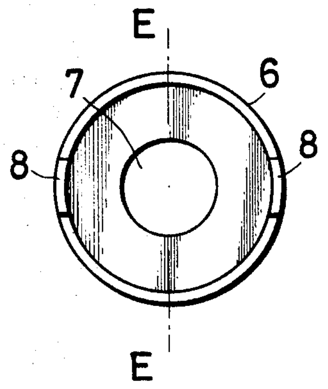
FIG. 6 is a bottom plan view of FIG. 1.
Figure 7:
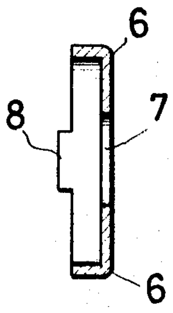
FIG. 7 is a sectional view taken on the line E–E of FIG. 6.

Referring now to the drawings, the detailed description of this invention is given below. The body of a radial bearing portion 1 is made of plastic in monoblock as shown in FIGS. 1, 3 and 4. Within this body, a plurality of grease pockets 2 are provided around a shaft bore 3 at the center of the body in an equally divided or symmetrical arrangement. These grease pockets 2 and the shaft bore 3 at the center of the body are connected by slots 4. Through these slots 4, grease charged in the grease pockets 2 is supplied at a proper rate to the radial shaft supporting surface of the shaft bore 3. The reference numeral 5 indicates a ring-shaped cover made of the same material as the body 1, which is fitted to the bottom of the body and bonded thereto by the use of a synthetic resin adhesive agent. A thrust bearing portion 6 is made of metal. This is made in the form of a cap as shown in FIGS. 5, 6 and 7. A shaft bore 7 is provided at the center thereof. This cap-shaped thrust bearing portion 6 is inserted into the top of the plastic radial bearing portion 1 as shown in FIGS. 1 and 2, and projections 8 for fit, which are provided at the periphery of the etc., bearing portion 6 in the opposite directions, are engaged with recesses 9 provided on the radial bearing portion 1 in the corresponding positions. In this manner, a combination thrust-radial bearing is obtained, wherein the radial bearing portion 1 and the thrust bearing portion 6 are combined in one body. In this construction, a clearance 10 is provided between the top surface of the radial bearing 1 and the bottom surface of the thrust bearing 6, as shown in FIG. 1.

Figure 8:
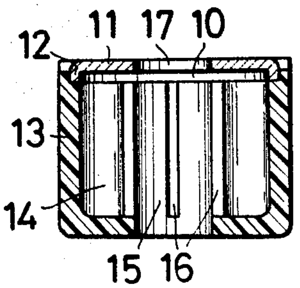
FIG. 8 is a vertical sectional front view taken on the line F–F of FIG. 9 showing another embodiment of this invention.
Figure 9:
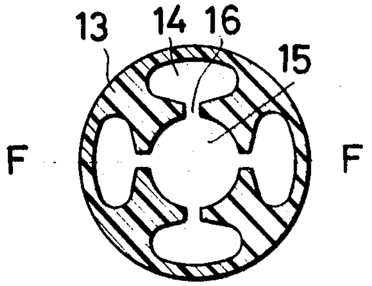
Figure 11:
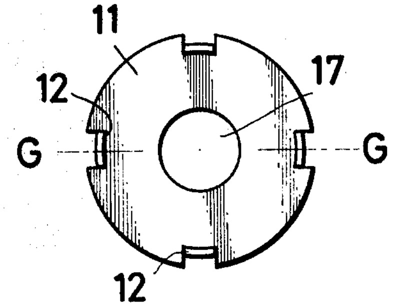
FIG. 11 is a bottom view of FIG. 10.
Figure 10:
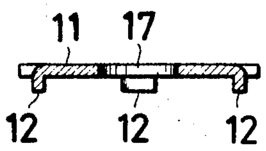
FIG. 10 is a sectional view taken on the line G–G of FIG. 11 which depicts only a thrust bearing portion of the bearing shown in FIG. 8.
Figure 12:
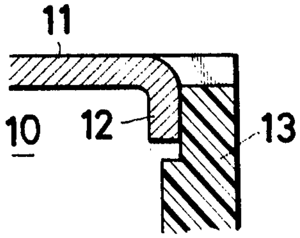
FIG. 12 is an enlarged sectional view of the assembled portion of radial and thrust bearing portions of the bearing shown in FIG. 8.

Another embodiment of this invention is illustrated in FIGS. 8 to 12. A thrust bearing portion 11 is made of metal plate. At the periphery of this thrust bearing 11, an appropriate number of cuts are made in the symmetrical position and bent downward to form claws 12 for fit. These claws 12 are inserted to the top end of a plastic radial bearing 13, as shown in FIG. 8 and 12. In this manner, the thrust bearing 11 is fitted into the radial bearing 13 (made of plastic) to serve also as a cover thereto. Thus completing a combination thrust-radial bearing of monoblock construction is obtained. In FIG. 8, the reference numeral 14 indicates grease pockets of the radial bearing 13, the numeral 15 shows a shaft bore at the center thereof, the numeral 16 represents slots 17 for supply of grease, and the numeral 17 shows a shaft bore at the center of the thrust bearing portion 11.

In either of the above-mentioned cases, thrust and radial frictions are supported by a separate portion, respectively, and a clearance 10 of a certain extent is provided between two portions for the purpose of adjusting the thermal expansion of the plastic bearing.

Figure 13:
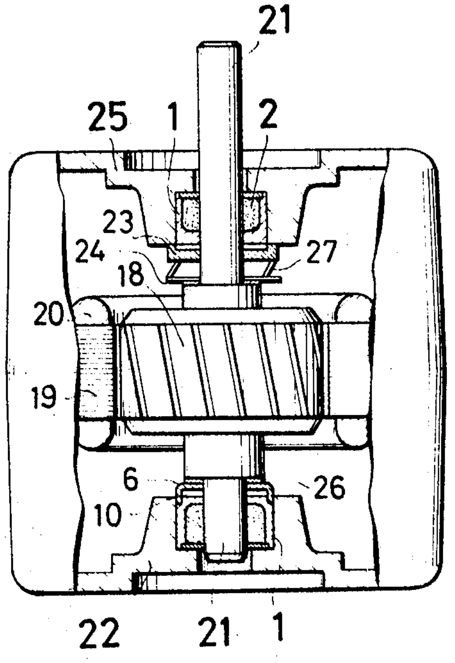
FIG. 13 is a vertical sectional front view, partly broken away, illustrating a case when a bearing of this invention is applied for a rotor shaft of an electric motor.

An example of application of a bearing embodying this invention for a rotating shaft of a small-type electric motor is illustrated in FIG. 13. Referring to FIG. 13, the numeral 18 indicates a rotor of an electric motor. The numeral 19 shows a stator thereof. The numeral 20 represents a coil and the numeral 21 indicates a rotating shaft of the rotor. This rotating shaft 21 is inserted in a motor case 22 in such a manner that the bottom end of said shaft is supported by a combination thrust radial bearing according to this invention which consists of a radial bearing portion 1 made of plastic and a thrust bearing portion 6 made of metal.

In the example of FIG. 13, near the upper end of the rotating shaft 21 of the motor is provided another plastic radial bearing portion 1 having grease pockets 2, under which a separately prepared metal or plastic thrust bearing portion 23 is located. This thrust bearing portion 23 is contacted to the bottom surface of a motor case 25 by way of a circular plate spring 24 for the adjustment of thermal expansion which is provided between said thrust bearing portion 23 and the top surface of the rotor 18. The reference numeral 26 indicates a thrust washer (made of plastic) inserted between the metal thrust bearing portion 6 and the rotor 18 near the bottom end of the rotating shaft 21.

Figure 14:
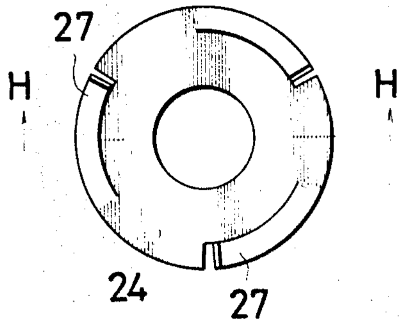
FIG. 14 is a plan view of an example of a circular plate spring for the adjustment of thermal expansion of the plastic bearing shown in FIG. 13.
Figure 15:
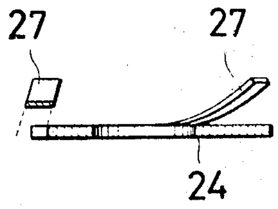
FIG. 15 is a sectional view taken on the line H–H of FIG. 14.

This circular plate spring 24 for the adjustment of thermal expansion is provided with a plurality of projections 27 at the periphery thereof as shown in FIGS. 14 and 15. These projections are raised upward so that they can be freely resilient due to elasticity to provide spring action.

In this example, although a clearance 10 of a certain extent is provided between the plastic radial bearing portion 1 and the thrust bearing portion 6, the thermal expansion of the plastic portion in the axial direction of the bearing can not be avoided when it is heated and thermal expansion is caused. Therefore, the rotating shaft is raised upward by the amount equal to said expansion. Accordingly, the circular plate spring 24 is provided as shown in FIG. 13 to adjust the effect of this thermal expansion. By the spring action of this spring, a clearance is provided to the shaft to enable free adjustment of the effect of thermal expansion.

According to this invention, in case when a plastic bearing for use with a high-speed rotating body is to carry both thrust and radial frictions simultaneously, a thrust bearing portion to carry thrust and a radial bearing portion to carry friction in the radial direction are separately prepared and, then they are combined to form a bearing. Therefore, it is possible to prevent the thermal expansion and deformation caused in a bearing of previous type when the same plastic portion of the bearing is subjected to simultaneous thrust and radial frictions of a rotating body and possible to prevent subsequent impediments and troubles to be caused by the overheating of rotating body supporting portion. Thus, a bearing of this invention is capable of maintaining smooth high-speed rotation of a rotating body.

What I claim is:

1. A combination thrust-radial bearing consisting of a thrust bearing portion to support the thrust force of a rotating shaft and a radial bearing portion to support the radial force of said rotating shaft, in which said thrust bearing portion being made of hard material in the shape of a flat ring and said radial bearing portion being made of synthetic plastic and having a center shaft bore to receive the shaft, a plurality of grease pockets to reserve and supply grease and slots between said shaft bore and grease pockets to pass said grease, and said thrust bearing portion being fixed into one side portion of said radial bearing portion leaving a certain space between them.

2. A combination thrust-radial bearing as claimed in claim 1, in which said thrust bearing portion being provided with annular upwardly extending portion on the periphery thereof, and said radial bearing portion being provided with a recess to receive said annular inwardly extending portion.

3. A combination thrust-radial bearing as claimed in claim 1, in which said thrust bearing portion being provided with a plurality of claws on the periphery thereof, and said radial bearing portion being provided with recesses to receive said claws.